(12) United States Patent
Persson et al.

(10) Patent No.: US 9,515,543 B2
(45) Date of Patent: Dec. 6, 2016

(54) METHOD FOR OPERATING A POWER CONVERTER MODULE AND A DEVICE THEREFOR

(75) Inventors: Oscar Persson, Kalmar (SE); Magnus Karlsson, Oskarshamn (SE); Jonas Malmberg, Färjestaden (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 128 days.

(21) Appl. No.: 14/357,715

(22) PCT Filed: Dec. 9, 2011

(86) PCT No.: PCT/SE2011/051492
§ 371 (c)(1),
(2), (4) Date: May 12, 2014

(87) PCT Pub. No.: WO2013/085442
PCT Pub. Date: Jun. 13, 2013

(65) Prior Publication Data
US 2014/0327414 A1    Nov. 6, 2014

(51) Int. Cl.
*H02M 1/32* (2007.01)
*H02M 1/00* (2006.01)
*G05F 1/56* (2006.01)

(52) U.S. Cl.
CPC .............. *H02M 1/00* (2013.01); *H02M 1/32* (2013.01); *G05F 1/56* (2013.01); *H02M 2001/0003* (2013.01)

(58) Field of Classification Search
CPC .. H02M 1/32; H02M 1/00; H02M 2001/003; G05F 1/10; G05F 1/46; G05F 1/56; G05F 1/565
See application file for complete search history.

(56) References Cited

U.S. PATENT DOCUMENTS 4,355,342 A    10/1982   Franzolini
7,239,119 B2 *  7/2007   Baurle .............. H02M 3/33507
                                              323/284
(Continued)

FOREIGN PATENT DOCUMENTS

CN    101263755 A    9/2008
CN    100533932 C    8/2009
DE    102005043882   3/2007

OTHER PUBLICATIONS

International Searching Authority, Application No. PCT/SE2011/051492, Sep. 27, 2012, 1 page.
(Continued)

*Primary Examiner* — Matthew Nguyen
(74) *Attorney, Agent, or Firm* — Nicholson, De Vos, Webster & Elliott LLP

(57) ABSTRACT

The present disclosure relates to methods, a system and a module for operating a power converter module. The power converter module comprises a voltage converter, an output circuitry, and a processing circuitry operable for controlling the voltage converter. One method comprises transmitting a first status signal representing operating parameters of the voltage converter to the processing circuitry. Determining whether the first status signal of the voltage converter is acceptable. The method also comprises transmitting a second status signal representing the operating parameters of the output circuitry to the processing circuitry. The method also comprises determining if the second status signal is above a predetermined threshold value. When the second status signal is above said predetermined threshold value and the status of the voltage converter is acceptable, entering a peak output mode operating the voltage converter at maximum power dissipation.

14 Claims, 8 Drawing Sheets

(56) References Cited

U.S. PATENT DOCUMENTS

| | | |
|---|---|---|
| 2005/0190517 A1 | 9/2005 | Schweigert et al. |
| 2006/0061922 A1* | 3/2006 | Mihai ................... B60L 3/0046 361/20 |
| 2011/0193410 A1 | 8/2011 | Glohr et al. |
| 2011/0221417 A1* | 9/2011 | Ishidoh ............... H02M 3/1588 323/288 |
| 2013/0106370 A1* | 5/2013 | Lin ................... H02M 3/33515 323/234 |

OTHER PUBLICATIONS

International Search Report, Application No. PCT/SE2011/051492, Sep. 27, 2012, 3 pages.
Written Opinion of the International Searching Authority, Application No. PCT/SE2011/051492, Sep. 27, 2012, 8 pages.
First China Office Action and Search Report for Application No. 201180075392.2, mailed Apr. 18, 2016, 21 pages.

* cited by examiner

METHOD FOR OPERATING A POWER CONVERTER MODULE AND A DEVICE THEREFOR

CROSS-REFERENCE TO RELATED APPLICATIONS

This application is a National stage of International Application No. PCT/SE2011/051492, filed Dec. 9, 2011, which are hereby incorporated by reference.

TECHNICAL FIELD

The embodiments described herein relate to a method for operating a power converter module and in particular to a method for operating a power converter module with increased power density.

BACKGROUND

The constant demand for increasing power densities of the power converters used today for supplying electronics with power causes the power converter circuits to operate at higher levels of stress. In addition, due to modern integrated electronics a demand for different supply voltages arises. In a modern electronic circuit it is rather common that the circuit needs a supply of e.g. 1.2 V, 1.5 V, 1.8 V and 3.3 V. This diversity of power rails have caused many designers to use intermediate bus power architectures using multiple on-board power converters.

Therefore, the importance of power converters is continuously increasing and the demand for higher efficiency is also continuously increasing.

To convert an input voltage to a different output voltage a voltage converter is needed. The most common type of voltage converters are switched mode voltage converters. A simple switched mode voltage converter comprises an input voltage terminal, an externally controlled switch, an inductor, a capacitor and a diode. The basic principle of such a switched mode voltage converter is that by means of the externally controlled switch the charging and discharging of the capacitor and the inductor is controlled and used for the conversion of the input voltage at the input terminal. If the external switch is efficient in terms of switching time and other losses the switched mode voltage converter becomes very efficient. However, some components of the voltage converter usually exhibit some losses, for example the core of the inductor imposes some limitations on the voltage conversion due to magnetic saturation thereof. Also the externally controlled switch that often comprises a MOSFET transistor imposes some limits on the maximum allowed switching voltage and current.

An example of such a switched mode voltage converter is a "buck" converter for down conversion of the input voltage. Such switched mode voltage converters are efficient and needs a minimum of large passive components compared to the older linear types of voltage regulators.

High reliability of the power converters is of course important; this demand often results in a safety margin of at least 15% for the power converters in nominal use. This means that a power converter only uses 85% of its nominal rating. The safety margin causes the power converters to become unnecessary large and expensive. These safety margins further cause the power converters to operate in a non-optimum way and this causes unnecessary energy losses due voltage conversion inefficiency.

A feasible way to operate power converters in a more optimum way is to utilize adaptive bus voltage. Adaptive bus voltage is implemented by having a first controllable power converter that feeds an intermediate bus voltage to a second power converter used for supplying the load with power. The first power converter adjusts the intermediate bus voltage to match the load of the system. Thereby, allowing the power converters to operate in a more optimum way. However, if the bus voltage is lowered and the demand for power suddenly increases, a temporary power shortage may occur that jeopardizes the functionality of the system. Therefore, the intermediate bus voltage is not allowed to be adjusted to such low levels that the actual load of the power converter suggests. Thus, the power converter is not allowed to operate using the optimum bus voltage.

SUMMARY

It is an object to provide a method and arrangements which allow a power converter to operate with increased power density.

The above stated object is achieved by means of methods, a module and a system according to the independent claims.

A first exemplary embodiment provides a method for operating a power converter module. The power converter module comprises an input terminal and an output terminal, and a voltage converter having an input side and an output side. The input side of the voltage converter is operatively connected to the input terminal of the power converter. The output side of the voltage converter is operatively connected to an output circuitry. The output circuitry is operable for measuring output parameters at the output terminal of the power converter module. The power converter module further comprises a processing circuitry, which is operable for controlling the voltage converter. The method comprises a step of transmitting a first status signal representing operating parameters of the voltage converter to the processing circuitry. The method also comprises a step of determining whether the status of the voltage converter is acceptable or unacceptable. According to a further step of the method a second status signal is transmitted to the processing circuitry. The second status signal represents the operating parameters of the output circuitry. The method also comprises determining if the second status signal is above a predetermined threshold value. When the second status signal is above the predetermined threshold value and the status of the voltage converter is acceptable, a peak output mode is entered according to the method. The peak output mode involves: determining based on a maximum output voltage if the output voltage at the output terminal is allowed to increase, increasing the output voltage if the output voltage at the output terminal is allowed to increase, and operating the voltage converter at maximum power dissipation as long as the status of the voltage converter is acceptable and the second status signal is above the predetermined threshold value.

A second exemplary embodiment provides a power converter module. The power converter module comprises an input terminal and an output terminal, and a voltage converter having an input side and an output side. The input side is operatively connected to the input terminal of the power converter. The output side is operatively connected to an output circuitry. The output circuitry is operable for measuring output parameters at the output terminal of the power converter module. The power converter module further comprises a processing circuitry, which is operable for controlling the voltage converter. The voltage converter is configured to transmit a first status signal representing operating parameters of the voltage converter to the processing circuitry. The processing circuitry is configured to determine whether the status of the voltage converter is acceptable or unacceptable. The output circuitry is configured to transmit a second status signal representing the operating parameters of the output circuitry to the processing circuitry. The processing circuitry is further configured to determine if the second status signal is above a predetermined threshold value, and control the power converter module to enter a peak output mode, if the second status signal is above said predetermined threshold value and the status of the voltage converter is acceptable. The peak output mode when executed involves determining based on a maximum output voltage if the output voltage at the output terminal is allowed to increase, increasing the output voltage if the output voltage at the output terminal is allowed to increase, and operating the voltage converter at maximum power dissipation as long as the status of the voltage converter is acceptable and the second status signal is above said predetermined threshold value.

A third exemplary embodiment provides a power converter system that comprises said power converter module, at least one power supply unit having an input side and an output side. The input side of the at least one power supply unit is operatively connected to the output terminal of the power converter module. The output side of the at least one power supply unit is arranged to provide an output voltage to a load. The power converter system also comprises an external unit operatively connected to said power converter module and to said at least one power supply unit.

An advantage of certain embodiments described herein is that a power converter module can safely operate at or above the maximum rating thereof.

Another advantage of some embodiments described herein is that adaptive operation of the power converter module can be fully exploited.

Yet another advantage of some embodiments described herein is that peak output mode allows less safety margins in the operation of the power converter module.

A further advantage of some embodiments of this disclosure is that remote monitoring of the power converter module is allowed.

A further advantage of some embodiments of this disclosure is that more power is available without changing the electronics.

A further advantage of some embodiments of this disclosure is that with adaptive bus voltage some embodiments will reduce power consumption, increase lifetime and lower the cost as well as reducing the size.

Further advantages and features of embodiments of the present invention will become apparent when reading the following detailed description in conjunction with the drawings.

DETAILED DESCRIPTION

The present invention will now be described more fully hereinafter with reference to the accompanying drawings, in which different exemplary embodiments are shown. These exemplary embodiments are provided so that this disclosure will be thorough and complete and not for the purpose of limitation.

Figure 1:
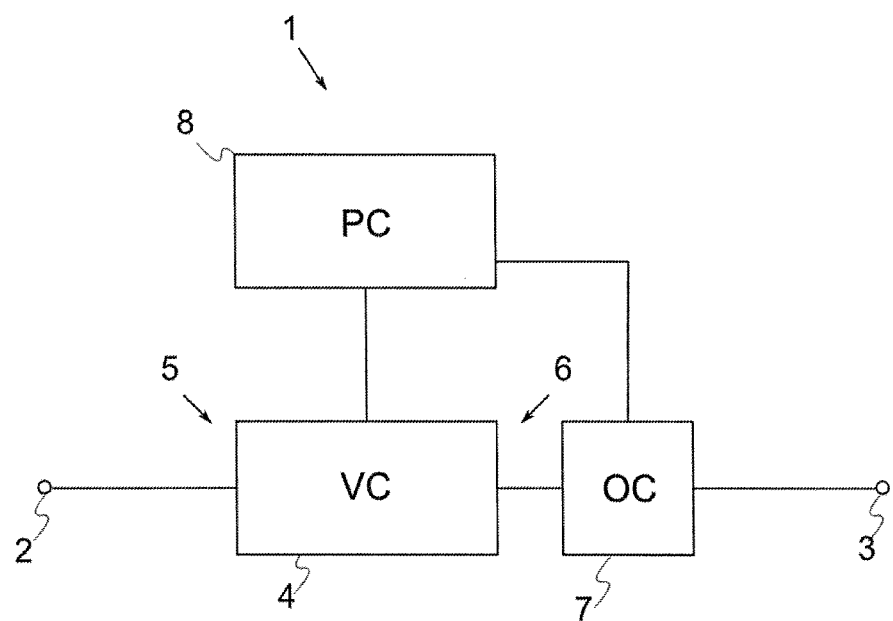
FIG. 1 is a schematic block diagram of a power converter module.

FIG. 1 is a schematic block diagram of an exemplary power converter module (PCM) commonly designated 1, which comprises an input terminal 2 for connection of input voltage. The PCM 1 further comprises a voltage converter (VC) 4 with an input side 5 and an output side 6. The VC 4 is operable for converting the input voltage at the input terminal 2 to a different output voltage at the output terminal 3. The VC 4 comprises a regular voltage converter, for example a switched mode voltage converter of either "buck" or "boost" type or an AC/DC converter. Other types of voltage converters such as isolated converters of flyback, forward, push-pull, fullbridge and halfbridge type are of course also possible to use as VC 4. The input side 5 of the VC 4 is operatively connected to the input terminal 2 of the PCM 1 whereas the output side 6 of the VC 4 is operatively connected to an output circuitry (OC) 7. The OC 7 is operatively connected to the output terminal 3 and is operable for measuring output parameters at the output terminal 3 of the PCM 1, such output parameters can for example be output voltage and output current at the output terminal 3. The PCM 1 further comprises a processing circuitry (PC) 8 operable connected to the VC 4 and the OC 7. The PC 8 in this embodiment is operable for controlling the VC 4 and receiving said output parameters from the OC 7. In an embodiment wherein the VC 4 is for example a buck, boost voltage converter or an isolated voltage converter of flyback, forward, push-pull, fullbridge or halfbridge type, the control signal from the PC 8 to the VC 4 is preferably a pulse width modulated signal.

Figure 2:
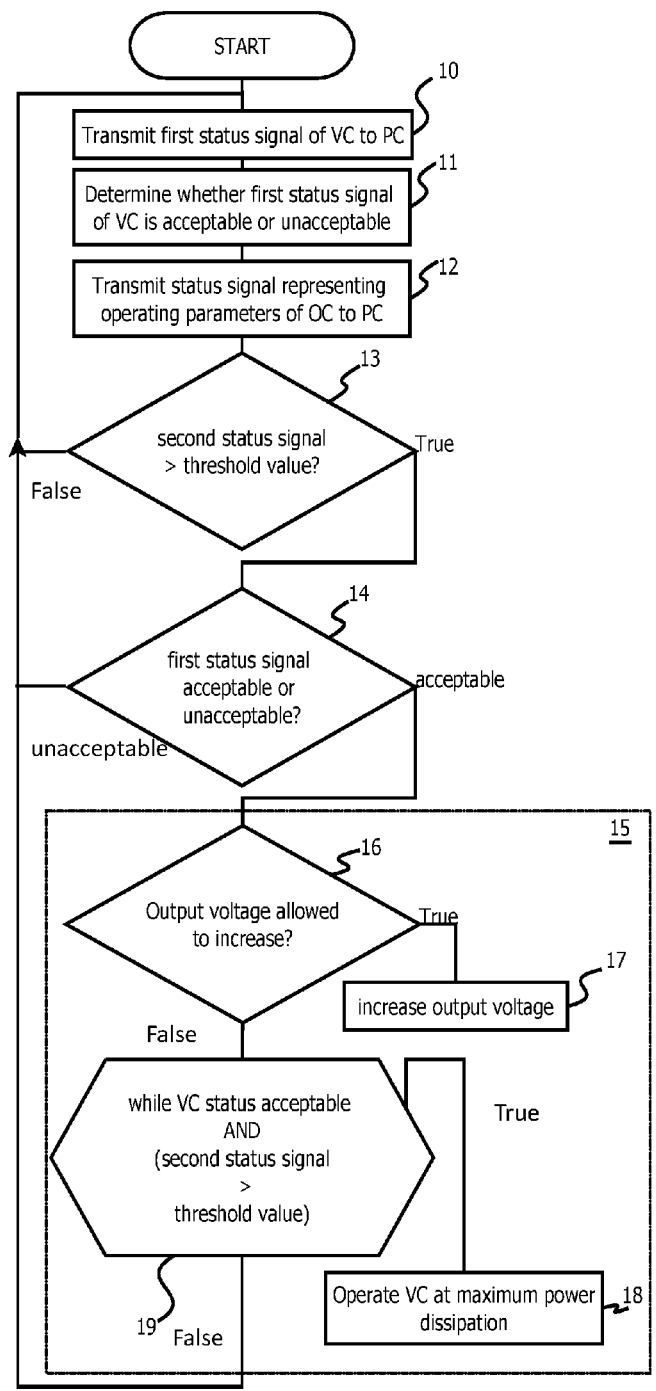
FIG. 2 is a flow diagram illustrating an embodiment of a method for operating a power converter.

FIG. 2 is a flow diagram of an exemplary method for operating a power converter according to embodiments of the invention. The method comprises:

A first step 10: Transmitting a first status signal of the VC 4 to the PC 8, this status signal can for example comprise information about temperature of critical components in the VC 4 such as the temperature of a core in an inductor.

A second step 11: Determining whether the first status signal of the VC 4 is acceptable or unacceptable, this determination can for example comprise a comparison of the first status signal with a value representing the maximum allowed temperature of the core of the inductor. But other comparisons are possible such as assessing whether the temperature of a switching element in the VC 4 is in an allowed range or not.

A third step 12: Transmitting a second status signal representing operating parameters of the OC 7 to the PC 8. This second status signal represents for example output voltage at the output terminal 3 and/or output current at the output terminal 3.

A fourth step 13: Determining if the second status signal is above a threshold value, the threshold value representing an allowed value for at least one operating parameter of the OC 7

A fifth step 14: When the second status signal is above the threshold value, the method comprises determining if the first status value is acceptable.

A sixth step 15: When the second status signal is above the threshold value and the first status signal is acceptable entering a peak output mode, wherein the peak output mode 15 involves:

A first sub step 16: Determining based on a maximum output voltage if the output voltage at the output terminal 3 is allowed to increase.

A second sub step 17: When the output voltage at the output terminal 3 is allowed to increase, increase the output voltage at the output terminal 3. For certain loads the allowed supply voltage is within a range. In such cases can the output voltage at the output terminal 3 increase to the maximum allowed voltage within the range. Thereby, causing the output current from the output terminal 3 to decrease.

A third sub step 19: While the first status signal is acceptable and the second status signal is above the threshold value, execute a fourth sub step 18.

The fourth sub step 18: Operate the VC 4 at maximum power dissipation, this means for example that the switching element in the VC 4 operate at maximum current and/or maximum voltage.

When the first status signal is not acceptable and/or the second status signal is below the threshold value, then return to the first step 10 of the method.

In an embodiment of the method disclosed hereinbefore comprises the fourth sub step 18 an additional step of operating the VC 4 at a higher current than the maximum current rating of the VC 4.

Figure 3:
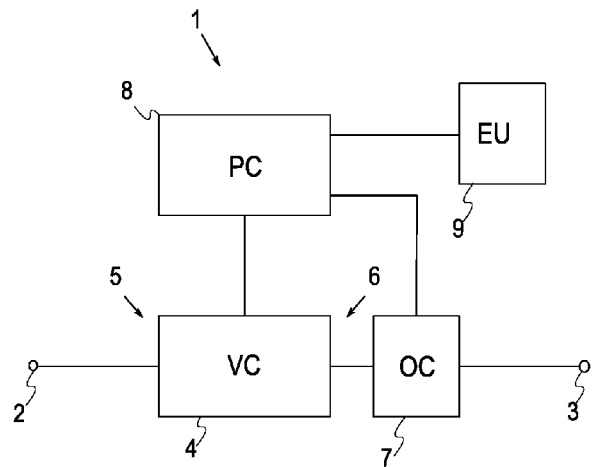
FIG. 3 is a schematic block diagram illustrating an embodiment of a power converter module.

FIG. 3 is a schematic block diagram of an exemplary PCM 1 comprising an external unit (EU) 9 operatively connected to the PC 8. Such an EU 9 can for example be a controller that communicates with the PCM 1 for transmitting and receiving information about operating characteristics of the PCM 1. The EU 9 can be connected to the PCM 1 by means of a data bus, such as an I²C- or a CAN-bus.

In another embodiment, the hereinbefore described EU 9 comprises means for external communication such as a communication bus operatively connected to an external means for remote monitoring and/or control.

Figure 4:
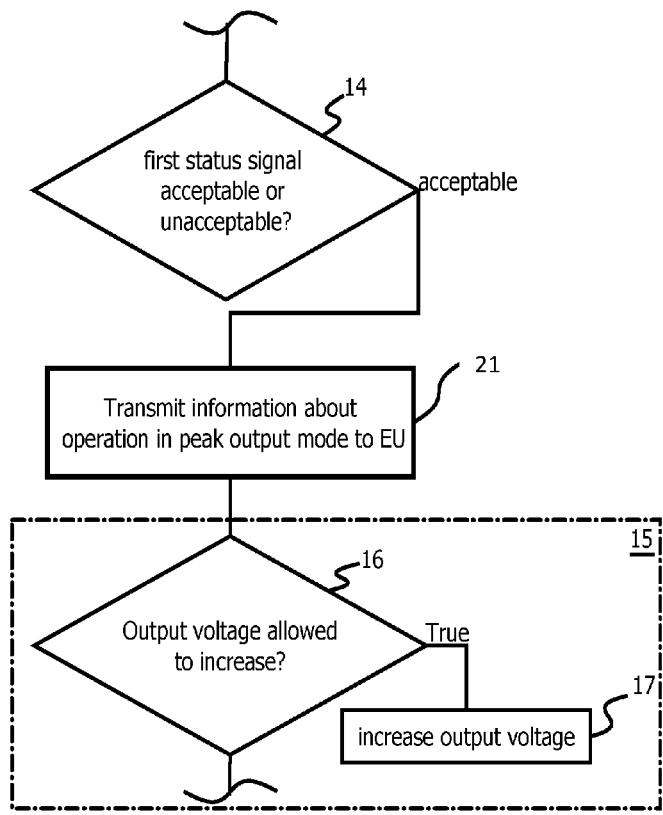
FIG. 4 is a flow diagram illustrating an embodiment of a method for operating a power converter module comprising a transmission step.

FIG. 4 is a flow diagram of a method according to an alternative embodiment. The method comprises the first step 10 to the sixth step 15 as hereinbefore described with reference to FIG. 2. The method comprises an additional step 21 of transmitting information about operation in peak output mode to the EU 9 in between the fifth step 14 and the sixth step 15. By including the step 21 into the method of operating a power converter module certain advantages occur, such as for example a possibility to monitor how many times the PCM 1 enters the peak output mode and/or how long the PCM 1 operated in the peak output mode. Such information can be valuable in order to assess estimated life time, warranty issues etc.

In an embodiment the PC 8 of the PCM 1 comprises a computer readable memory and is operatively connected to the EU 9. This embodiment enables the PCM 1 to store information about the operation in peak output mode in the computer readable memory of the PC 8, wherein the step, as described with reference to FIG. 4, of transmitting 21 the information about the operation in peak output mode 15 involves transmitting the information stored in the computer readable memory to the external unit 9. This embodiment allows, as an example, external polling of the information about the operation in peak output mode. Said polling can for example be performed remotely from the PCM 1 and wireless, thereby allowing an operator to continuously monitor the status of the PCM 1 remotely. Such monitoring can e.g. be useful for assessing estimated lifetime, warranty issues and optimization possibilities.

By utilizing a computer readable memory in the PC 8, several different possibilities arise in terms of accessing the information stored therein. As a first example the information stored in the computer readable memory can be accessed by the EU 9 at predetermined intervals such as monthly, weekly, daily, or at the time of entering the peak output mode. Another example is that the PC 8 sends a signal to the EU 9 when a predetermined number of activations of peak output mode have been reached. This signal can then be used for initiating service, repair or replacement. A variant of the latter example is to have a predetermined time in peak output mode and when this time is lapsed the PC 8 sends a signal to the EU 9. Yet another variant is to disable peak output mode after a predetermined number of activations of peak output mode or alternatively after a predetermined time in peak output mode.

Yet another embodiment of the method, described with reference to FIG. 4, is to store the information about entering peak output mode directly in the EU 9.

In another embodiment, the hereinbefore described EU 9 is operatively removable connected to the PCM 1, and operatively connected to the PCM 1 only during manufacturing and service. Thereby, allowing programming of the computer readable memory in the PC 8, this programming can for example involve setting allowed output voltage ranges. Thus, this arrangement allows manual optimization of the operating parameters of the PCM 1. Such an optimization might comprise the steps of changing the settings for the output voltage at the output terminal 3. Followed by a step of operating the PCM 1 for a predetermined time and then control how many times/how long the PCM 1 entered peak output mode during said predetermined time. The final step in this manual optimization loop is to adjust the settings and execute the loop until a final setting is acquired. The EU 9 might not be connected to the PCM 1 during the whole sequence but only for programming and reading said computer readable memory in PC 8.

Figure 5:
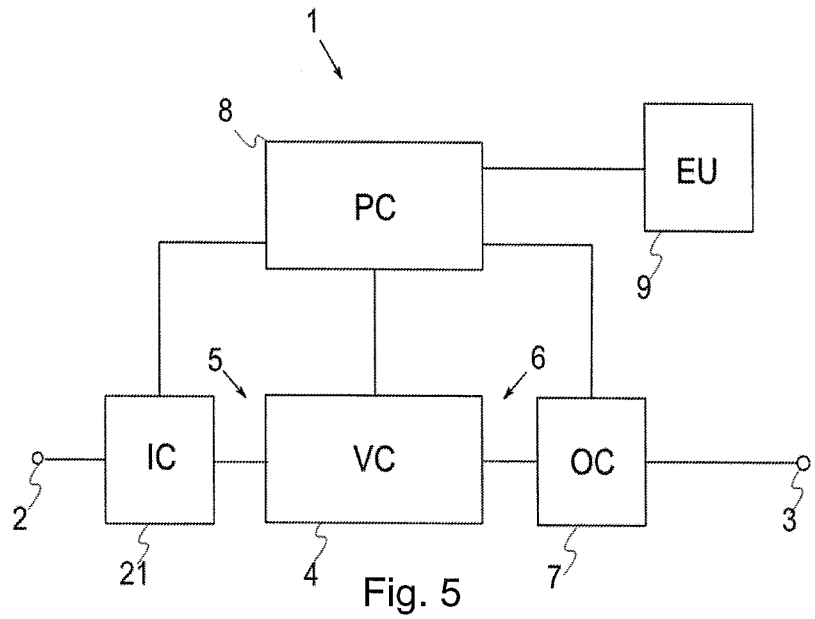
FIG. 5 is a schematic block diagram illustrating an embodiment of a power converter module comprising an input circuitry.

In FIG. 5 an embodiment of a PCM 1 comprising an input circuitry (IC) 21 is disclosed. The IC 21 is arranged between the input terminal 2 and the input side 5 of the VC 4. The IC 21 is further operatively connected to the PC 8 and operable for transmitting a third status signal representing operating parameters at the input terminal 2 to the PC 8. These operating parameters can for example be input voltage and/or input current at the input terminal 2.

The third status signal enables the PC 8 to compensate for a low input voltage and high input voltage respectively, at the input terminal 2 by means of adjusting the control signal from the PC 8 to the VC 4. Such an adjustment can for example be a change of the duty cycle in a pulse width modulated (PWM) control signal. This can be of great importance for a PCM 1 with a varying input voltage at the input terminal 2 due to adaptive bus voltage. Thus, the embodiment described hereinbefore enables an optimum bus voltage at the input terminal 2, due to the fact that a sudden demand for power can be fulfilled by allowing the PCM 1 to enter peak output mode. Thereby, allowing lower bus voltages without jeopardizing the functionality of the PCM 1 by means peak output mode.

Figure 6:
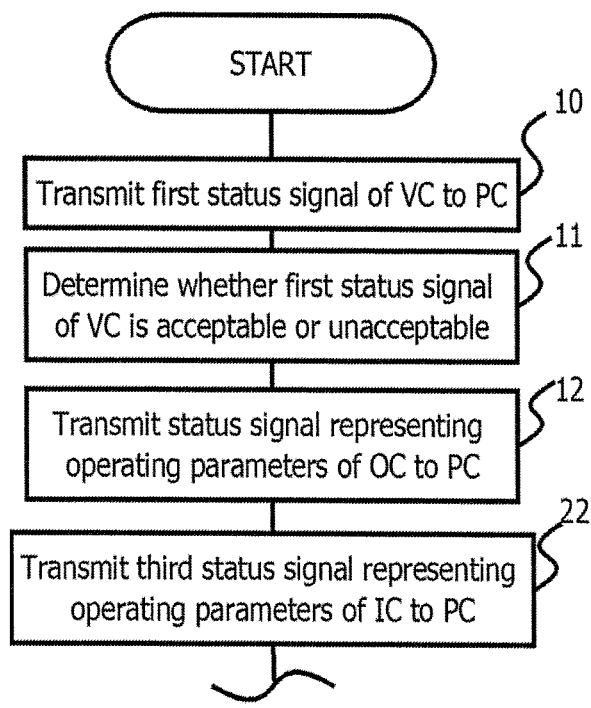
FIG. 6 is a flow diagram illustrating an embodiment of a method for operating a power converter module comprising an input circuitry.

In FIG. 6 a flow diagram illustrating an embodiment of the method for operating a PCM 1 comprising an IC 21 is disclosed. The method comprises the first step 10 to the sixth step 15 as described with reference to FIG. 2 above. The method additionally comprises a step 22, between the third step 12 and the fourth step 13, of transmitting the third status signal representing operating parameters of the IC 21 to the PC 8.

In an embodiment of the method for operating a PCM 1 the method comprises controlling the input voltage at the input terminal 2 of the PCM 1 by means of the EU 9. Thus, allowing adaptive adjustment of the input voltage at the input terminal 2 by the EU 9. This means that, if the load connected to the output terminal 3 of the PCM 1 suddenly decreases, the EU 9 can decrease the input voltage, and if the load connected to the output terminal 3 of the PCM 1 suddenly increases the EU 9 can increase the input voltage at the input terminal 2. Hence, fully adaptive operation is achieved by adding these steps.

In one embodiment of the method for operating a PCM 1 the method as disclosed herein is executed in between the pulses in the control signal from the PC 8 to the VC 4. Thereby, allowing real time control of the PCM 1. For example, if the control signal from the PC 8 to the VC 4 is a PWM signal, the method as disclosed is executed in between the pulses of the PWM signal, thereby achieving said real time control of the PCM 1.

Figure 7:
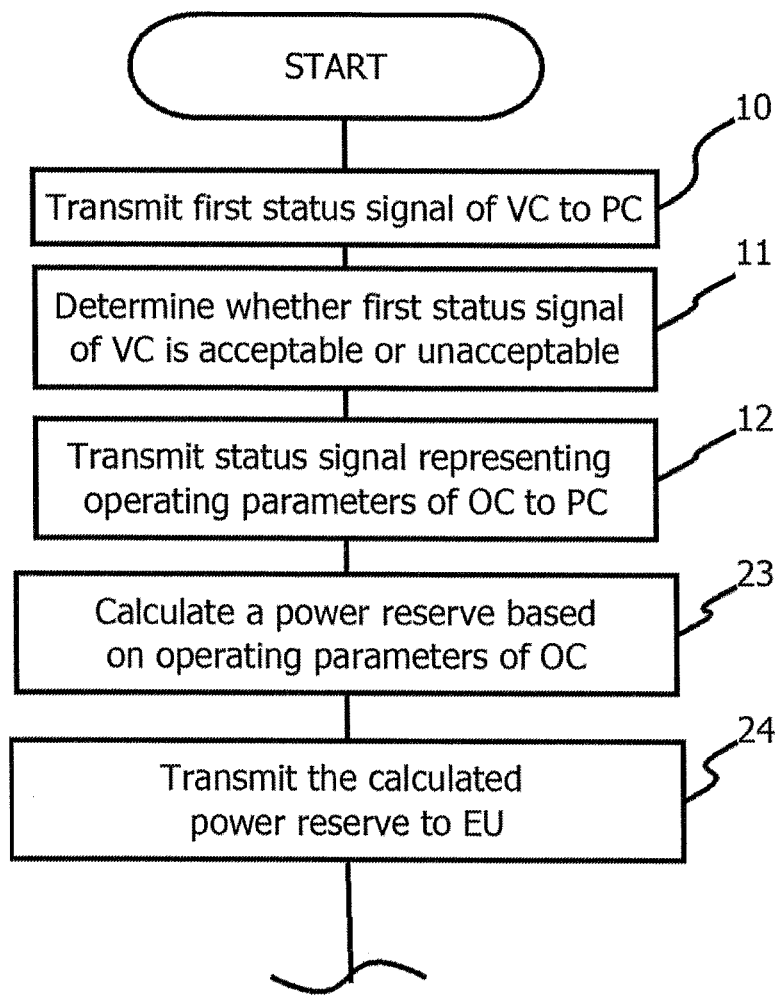
FIG. 7 is a flow diagram illustrating an embodiment of a method for operating a power converter module comprising a transmission step.

In FIG. 7 a flow diagram illustrating an embodiment of the method for operating a power converter comprising, in addition to the aforementioned steps, additional steps of calculating a power reserve based on the operating parameters of the output circuitry. The method further comprises transmitting said power reserve to the EU 9. This power reserve can be calculated as the difference between the actual power delivered to the load and the maximum power allowed in the peak output mode. Hence, by measuring the output voltage and the output current by means of the OC 7 the power reserve can easily be calculated. The calculated power reserve can be transmitted from the EU 9 by means of communication channels or buses, such as I²C or CAN-bus. A further use of the calculated power reserve is within the area of adaptive operation, wherein the calculated power reserve can be used for assessing how much the bus voltage is allowed to be decreased or increased.

The calculated power reserve can be of great importance during adaptive operation of the PCM 1 as described hereinbefore. If the load suddenly increases when the output voltage at the output terminal 3 is adjusted to a low value due to a decreased load, the probability of a power shortage of the PCM 1 increases. In such case the time needed to increase the output voltage supplied from the PCM 1 is not sufficient in order to prevent a power shortage. In this case the power reserve can be of great use due to the fact that the instantly available power in the power reserve gives the EU 9 some extra time to increase the output voltage from the PCM 1 and thereby allowing the PCM 1 to operate at a more optimum output voltage.

Figure 8:
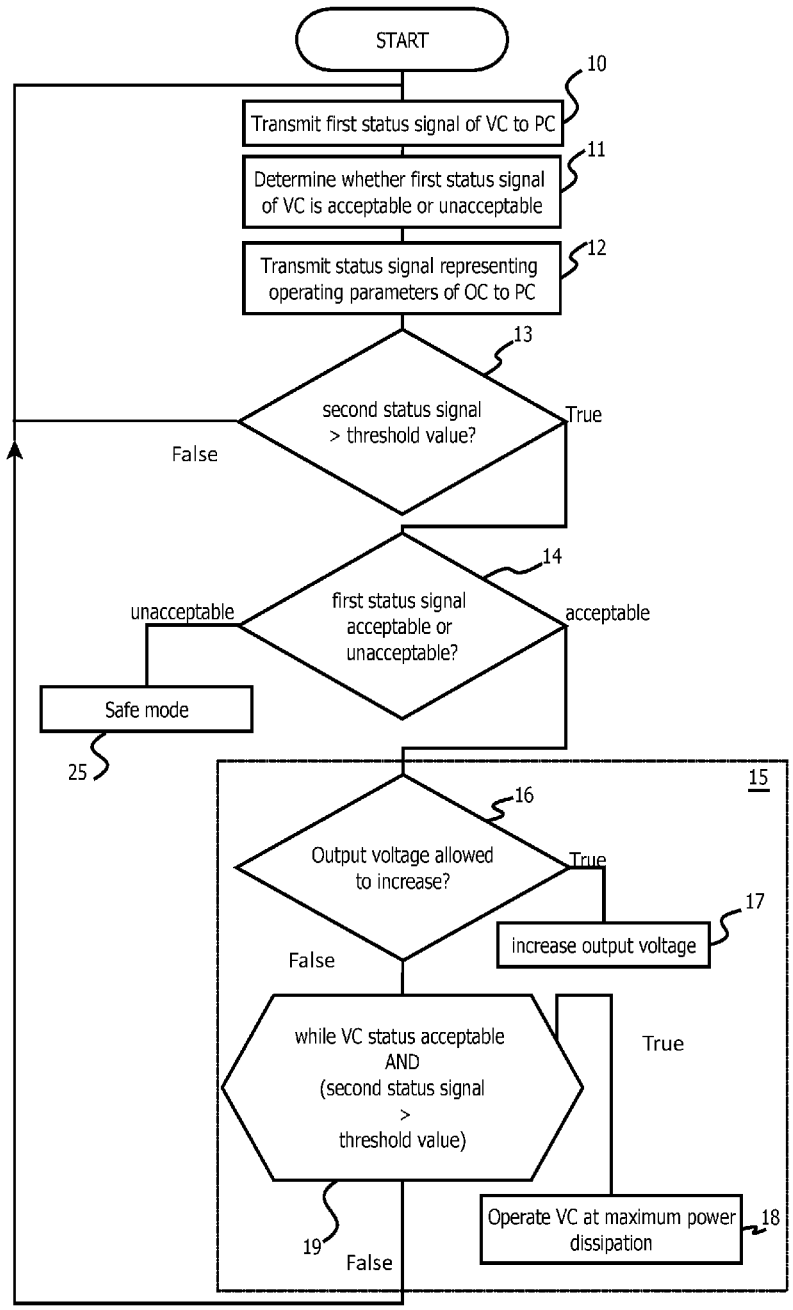
FIG. 8 is a flow diagram illustrating an embodiment of a method for operating a power converter module comprising entering a safe mode.

In FIG. 8 an embodiment of the method for operating a PCM 1 is disclosed as a flow diagram. In this embodiment the method comprises an additional step in connection with the fifth step of the method as described hereinbefore with reference to FIG. 2. The additional step is executed if the first status signal is unacceptable and brings the output voltage at the output terminal 3 of the PCM 1 to a safe level such as zero. In practice this means that the load effectively becomes unsupplied with power. This safe mode can be useful if the load is short circuited. The safe mode can also comprise turning off some functionality in the load and bring the load to an idle condition. Hence, the power reserve makes it possible to safely operate the PCM 1 at the maximum possible level.

Figure 9:
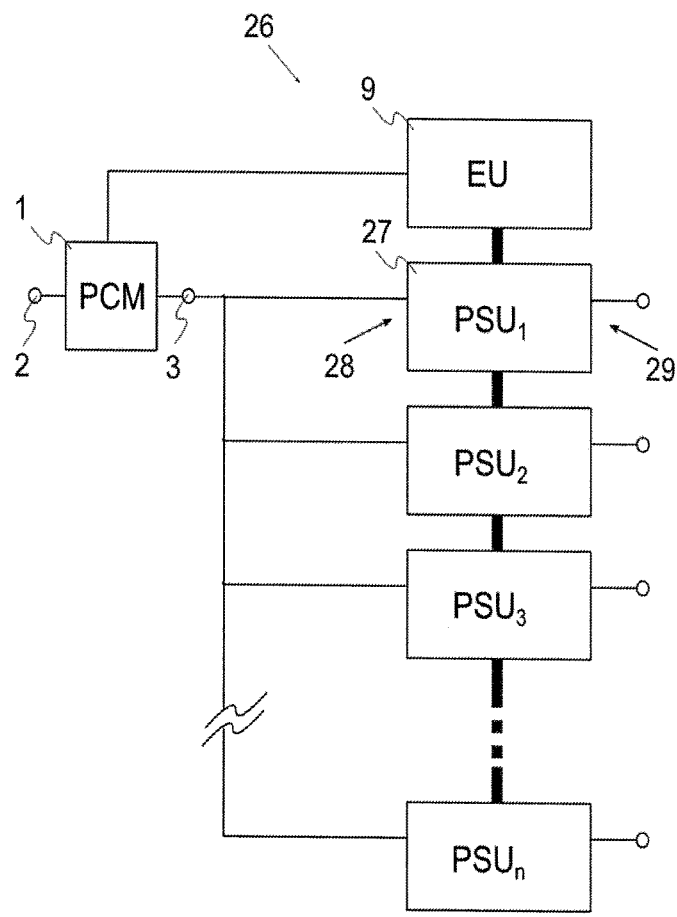
FIG. 9 is a schematic block diagram illustrating an embodiment of a power converter system.

In FIG. 9 a schematic block diagram of a power converter system 26 is disclosed. The power converter system 26 comprises a PCM 1, at least one power supply unit (PSU) 27, and an EU 9. The PSU 27 is in one embodiment a converter of "buck" type. The PSU 27 having an input side 28 and an output side 29. The input side 28 of the PSU 27 is operatively connected to the output terminal 3 of the PCM 1, and the output side 29 of the at least one PSU 27 is arranged to provide a load with output voltage from the PSU 27. Said EU 9 is operable for controlling the output voltage from the PCM 1 as well as monitoring the PCM 1 and the at least one PSU 27.

In one embodiment of the hereinbefore disclosed system is the at least one PSU 27 arranged to provide a different output voltage based on signals received from the load. Such loads can for example be a central processing unit that needs different supply voltages based on the operating mode thereof.

The power converter system 26 disclosed herein is advantageously used in connection with adaptive bus voltage. This adaptive bus voltage involves measuring the actual load and based on that measurement adapt the bus voltage at the output terminal 3 of the PCM 1 in order to provide optimum conditions for the PSU 27.

In yet another embodiment of a power converter system 26 is the range of adaptive output voltages from the PCM 1 adjusted by means of programming the PCM 1 during manufacturing and the EU 9 is only operatively connected during programming.

In some power converter systems 26, 30 the power consumption is very high and the PCM 1 runs out of current even at nominal operation voltage. In such systems adaptive bus voltage is a way to mitigate the effects of the high power consumption. This mitigation is achieved by means of increasing the output voltage over the nominal setting. This means that the output voltage at the output terminal 3 of the PCM 1 must be higher than the minimum operation voltage. Hence, by increasing the output voltage of the PCM 1 decreases the output current from the PCM 1 and the PCM 1 operates in a more efficient way. The effect of the increase of the output voltage of the PCM 1 is that the PCM 1 can deliver more power than suggested by the nominal rating.

In some power converter systems 26, 30 the load is very low in idle mode of operation. If adaptive bus voltage is utilized the bus voltage might be reduced to a low level as a result of the idle mode of operation. Hence, if a sudden demand for more power arises the adjustment of the adaptive bus voltage might not be quick enough and a power shortage might occur. In order to avoid such power shortages it is common to not allow such low bus voltages that the low load suggests. Thereby, causing not optimum conditions for the at least one PSU 27. In such cases the peak output mode is a solution that will enable low bus voltages by means of allowing some extra current to be delivered to the load instantly if needed. Thus, the peak output mode is an energy saving feature that allows the PCM 1 to operate at lower output voltages and thereby causing the whole system to operate in an energy efficient manner.

Figure 10:
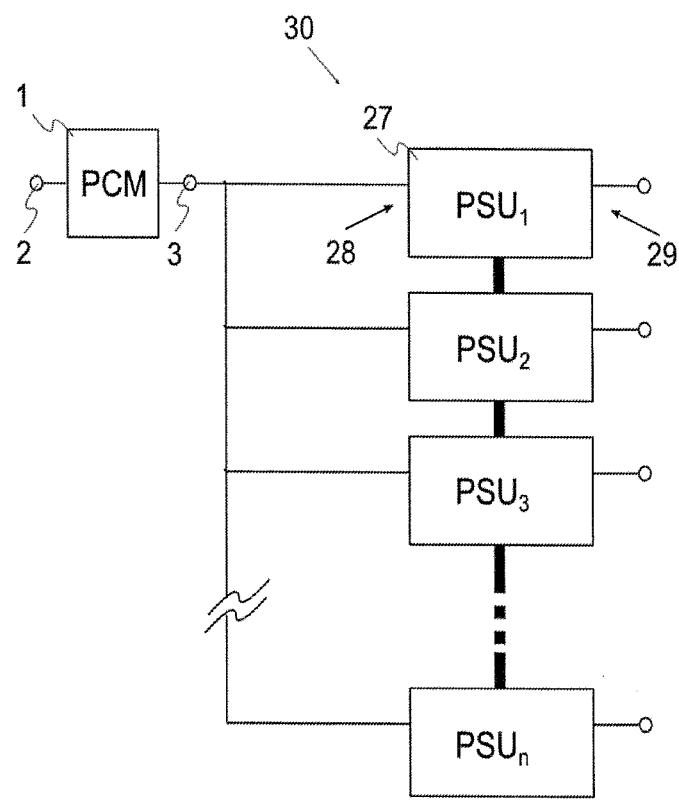
FIG. 10 is a schematic block diagram illustrating an embodiment of a power converter system.

In FIG. 10 a schematic block diagram of a power converter system 30 is disclosed. The power converter system 30 comprises a PCM 1, at least one power supply unit (PSU) 27. The PSU 27 having an input side 28 and an output side 29. The input side 28 of the PSU 27 is operatively connected to the output terminal 3 of the PCM 1, and the output side 29 of the at least one PSU 27 is arranged to provide a load with output voltage from the PSU 27.

In some embodiments of the power converter system can peak output mode be of great importance for adaptive control thereof. This is due to the fact that the recording in computer readable memory of utilization of peak output mode can be used in a feedback loop provided for adaptive optimization of the output voltage at the output terminal 3 of the PCM 1. This adaptive optimization can be performed either automatically or manually by an operator.

The above mentioned and described embodiments are only given as examples and should not be limiting. Other solutions, uses, objectives, and functions within the scope of the accompanying patent claims may be possible.

The invention claimed is:

1. A method for operating a power converter module, wherein the power converter module includes an input terminal, an output terminal, and a voltage converter having an input side and an output side, wherein the input side the output side is operatively connected to an output circuitry, wherein the output circuitry is further operatively connected to the output terminal and operable for measuring output parameters at the output terminal of the power converter module, wherein the power converter module further includes a processing circuitry operatively connected to the voltage converter and to the output circuitry, and wherein the processing circuitry is operable for controlling the voltage converter, the method comprising:
    transmitting a first status signal representing operating parameters of the voltage converter to the processing circuitry;
    determining whether the first status signal of the voltage converter is acceptable or unacceptable;
    transmitting a second status signal representing the operating parameters of the output circuitry to the processing circuitry;
    determining if the second status signal is above a predetermined threshold value; and
    when the second status signal is above said predetermined threshold value and the first status signal of the voltage converter is acceptable, entering a peak output mode, wherein the peak output mode involves:
        determining based on a maximum output voltage if an output voltage at the output terminal is allowed to increase;
        increasing the output voltage if the output voltage at the output terminal is allowed to increase; and
        operating the voltage converter at maximum power dissipation as long as the first status signal of the voltage converter is acceptable and the second status signal is above said predetermined threshold value.

2. The method according to claim 1, wherein said processing circuitry is operatively connected to an external unit, and the method further comprising:
    transmitting information about operation in the peak output mode to the external unit.

3. The method according to claim 2, wherein said processing circuitry includes computer readable memory and is operatively connected to the external unit, the method further comprising:
    storing the information about the operation in the peak output mode in said computer readable memory of the processing circuitry, wherein said step of transmitting the information about the operation in the peak output mode involves transmitting the information stored in the computer readable memory to the external unit.

4. The method according to claim 2, wherein said power converter module further includes an input circuitry arranged between said input terminal of the power converter module and the input side of the voltage converter, the input circuitry is operatively connected to said processing circuitry and operable for measuring operating parameters of the input terminal of the power converter module, and the method further comprises:
    transmitting a third status signal representing operating parameters of the input circuitry to the processing circuitry.

5. The method according to claim 4, wherein an input voltage at the input terminal of the power converter module is controlled by the external unit in response to said received information about the operation in the peak output mode.

6. The method according to claim 1, wherein said processing circuitry controls the output voltage at the output terminal of the power converter module by means of a pulse width modulated control signal and the method steps are executed in between the pulses in the pulse width modulated control signal.

7. The method according to claim 2, wherein the method further comprises the step of:
    calculating a power reserve based on the operating parameters of the output circuitry; and
    transmitting the calculated power reserve to said external unit.

8. The method according to claim 1, further comprising:
    when the status of the voltage converter is unacceptable, entering a safe mode, wherein the safe mode involves adjusting the output voltage at the output terminal to a predetermined safe level.

9. A power converter module, the power converter module comprising:
    an input terminal;
    an output terminal;
    a voltage converter having an input side and an output side, the input side is operatively connected to the input terminal of the power converter module, the output side is operatively connected to an output circuitry;
    the output circuitry operable for measuring output parameters at the output terminal of the power converter module; and
    a processing circuitry operatively connected to the voltage converter and to the output circuitry, and operable for controlling the voltage converter, wherein the voltage converter is configured to transmit a first status signal representing operating parameters of the voltage converter to the processing circuitry,
    the processing circuitry is configured to determine whether the first status signal of the voltage converter is acceptable or unacceptable, the output circuitry is configured to transmit a second status signal representing the operating parameters of the output circuitry to the processing circuitry, the processing circuitry is configured to determine if the second status signal is above a predetermined threshold value, and control the power converter module to enter a peak output mode, if the second status signal is above said predetermined threshold value and the status of the voltage converter is acceptable, wherein the peak output mode when executed involves:

determining based on a maximum output voltage if an output voltage at the output terminal is allowed to increase, increasing the output voltage if the output voltage at the output terminal is allowed to increase, and operating the voltage converter at maximum power dissipation as long as the first status signal of the voltage converter is acceptable and the second status signal is above said predetermined threshold value.

10. The power converter module according to claim 9, wherein said processing circuitry is operatively connected to an external unit, and is configured to transmit information about operation in the peak output mode to the external unit.

11. The power converter module according to claim 10, wherein said processing circuitry includes computer readable memory and is operatively connected to an external unit, and is further configured to:

store the information about the operation in peak output mode in said computer readable memory of the processing circuitry, wherein the external unit is configured to transmit the information about the operation in the peak output mode by transmitting the information stored in the computer readable memory to the external unit.

12. The power converter module according to claim 9, wherein said power converter module comprises an input circuitry arranged between said input terminal of the power converter module and the input side of the voltage converter, the input circuitry is operatively connected to said processing circuitry and operable for measuring operating parameters of the input terminal of the power converter module, and is further configured to:

transmit a third status signal representing operating parameters of the input circuitry to the processing circuitry.

13. A power converter system comprising:

a power converter module including:

an input terminal;

an output terminal;

a voltage converter having an input side and an output side, the input side is operatively connected to the input terminal of the power converter module, the output side is operatively connected to an output circuitry;

the output circuitry operable for measuring output parameters at the output terminal of the power converter module;

a processing circuitry operatively connected to the voltage converter and to the output circuitry, and operable for controlling the voltage converter, wherein the voltage converter is configured to transmit a first status signal representing operating parameters of the voltage converter to the processing circuitry, the processing circuitry is configured to determine whether the first status signal of the voltage converter is acceptable or unacceptable, the output circuitry is configured to transmit a second status signal representing the operating parameters of the output circuitry to the processing circuitry, the processing circuitry is configured to determine if the second status signal is above a predetermined threshold value, and control the power converter module to enter a peak output mode, if the second status signal is above said predetermined threshold value and the status of the voltage converter is acceptable, wherein the peak output mode when executed involves:

determining based on a maximum output voltage if an output voltage at the output terminal is allowed to increase, increasing the output voltage if the output voltage at the output terminal is allowed to increase, and operating the voltage converter at maximum power dissipation as long as the first status signal of the voltage converter is acceptable and the second status signal is above said predetermined threshold value, at least one power supply unit having an input side and an output side, wherein the input side of the at least one power supply unit is operatively connected to the output terminal of the power converter module, the output side of the power supply unit is arranged to provide an output voltage to a load; and an external unit operatively connected to said power converter module and to said at least one power supply unit.

14. The power converter system according to claim 13 wherein said power converter module is operatively connected to said external unit and controllable therefrom, thereby allowing adaptive input voltage to the input side of the at least one power supply unit.

* * * * *